US012687480B2

(12) United States Patent
Kawamura et al.

(10) Patent No.: US 12,687,480 B2
(45) Date of Patent: Jul. 21, 2026

(54) FLOW CELL OF FLOW CYTOMETER AND CLEANING METHOD OF FLOW CELL OF FLOW CYTOMETER

(71) Applicant: ThinkCyte K.K., Tokyo (JP)

(72) Inventors: Yoko Kawamura, Tokyo (JP); Keiji Nakagawa, Tokyo (JP); Keisuke Toda, Tokyo (JP)

(73) Assignee: THINKCYTE K.K., Tokyo (JP)

( * ) Notice: Subject to any disclaimer, the term of this patent is extended or adjusted under 35 U.S.C. 154(b) by 990 days.

(21) Appl. No.: 17/794,187

(22) PCT Filed: Jan. 21, 2021

(86) PCT No.: PCT/JP2021/002017
§ 371 (c)(1),
(2) Date: Jul. 20, 2022

(87) PCT Pub. No.: WO2021/149759
PCT Pub. Date: Jul. 29, 2021

(65) Prior Publication Data
US 2023/0039952 A1 Feb. 9, 2023

(30) Foreign Application Priority Data

Jan. 22, 2020 (JP) ................................. 2020-008711

(51) Int. Cl.
*G01N 15/1404* (2024.01)
*B08B 9/032* (2006.01)
(Continued)

(52) U.S. Cl.
CPC ....... *G01N 15/1404* (2013.01); *B08B 9/0321* (2013.01); *G01N 15/1434* (2013.01); (Continued)

(58) Field of Classification Search
CPC ........... G01N 15/1404; G01N 15/1434; G01N 15/149; G01N 2015/1006; B08B 9/0321; B08B 2209/032
See application file for complete search history.

(56) References Cited

U.S. PATENT DOCUMENTS

2005/0158213 A1    7/2005  Tsudome et al.
2016/0139026 A1*   5/2016  Takeda ............... G01N 15/1484
                                                                    435/30
(Continued)

FOREIGN PATENT DOCUMENTS

JP        2005-199164 A    7/2005
JP        2005-214691 A    8/2005
(Continued)

OTHER PUBLICATIONS

International Search Report for PCT/JP2021/002017 mailed on Mar. 23, 2021.
(Continued)

*Primary Examiner* — Charles Capozzi
*Assistant Examiner* — Alex Ramirez
(74) *Attorney, Agent, or Firm* — Birch, Stewart, Kolasch & Birch, LLP

(57) ABSTRACT

A flow cell of the flow cytometer of the present invention includes: a sample flow path through which a sample fluid containing a sample flows; and a sample fluid supply portion which communicates with an upstream end of the sample flow path in the sample fluid flow direction and supplies the sample fluid to the sample flow path, wherein the sample fluid supply portion includes a plurality of sample opening portions which supply a sample fluid to the sample flow path, a cleaning liquid supply opening portion to which a second tube is connectable and which supplies a cleaning liquid for cleaning the sample fluid supply portion, and a cleaning liquid discharge opening portion to which a first (Continued)

tube is connectable and which discharges the cleaning liquid from the sample fluid supply portion.

20 Claims, 6 Drawing Sheets

(51) Int. Cl.
  *G01N 15/10*       (2024.01)
  *G01N 15/1434*    (2024.01)
  *G01N 15/149*      (2024.01)

(52) U.S. Cl.
  CPC ................... *B08B 2209/032* (2013.01); *G01N 2015/1006* (2013.01); *G01N 15/149* (2024.01)

(56) References Cited

U.S. PATENT DOCUMENTS

2018/0243744 A1    8/2018   Cai et al.
2018/0345289 A1   12/2018   Kitagawa et al.

FOREIGN PATENT DOCUMENTS

| JP | 2017-504037 | A | 2/2017 |
|----|----|----|----|
| JP | 2018-141689 | A | 9/2018 |
| JP | 2018-205047 | A | 12/2018 |
| JP | 2019-7893 | A | 1/2019 |
| JP | 2021-521417 | A | 8/2021 |
| WO | WO 2015/053393 | A1 | 4/2015 |
| WO | WO 2015/063552 | A2 | 5/2015 |
| WO | WO 2019/199499 | A1 | 10/2019 |

OTHER PUBLICATIONS

Japanese Notice of Allowance for Japanese Application No. 2024-108884, dated Sep. 30, 2025, with English translation.

* cited by examiner

FLOW CELL OF FLOW CYTOMETER AND CLEANING METHOD OF FLOW CELL OF FLOW CYTOMETER

TECHNICAL FIELD

The present invention relates to a flow cell of a flow cytometer and a cleaning method of the flow cell of the flow cytometer.

Priority is claimed on Japanese Patent Application No. 2020-008711, filed Jan. 22, 2020, the content of which is incorporated herein by reference.

BACKGROUND ART

A flow cell used in a flow system of a flow cytometer is known (for example, Patent Document 1).

The flow cell described in Patent Document 1 includes a flow path through which a sample fluid and a sheath fluid flow, a sample flow path which introduces the sample fluid into the flow path, and at least one sheath flow path which introduces the sheath fluid into the flow path. An upstream end of the sample flow path in the flow direction is provided with a sample fluid supply portion to which the sample fluid is supplied.

CITATION LIST

Patent Literature

[Patent Document 1]
Japanese Unexamined Patent Application, First Publication No. 2019-7893

SUMMARY OF INVENTION

Technical Problem

If a sample which flows earlier remains when a plurality of types of samples are allowed to flow through a flow cell, a sample which flows later flows in a mixed state with the sample which flows earlier, and the measuring and sorting results of target samples may be affected.

For example, a flow cytometer which measures a training sample in advance to create training data and creates a prediction model on the basis of the generated training data to classify target samples has been developed. In the flow cytometer using such machine learning, the accuracy of the generated training data is affected by the purity of the training sample. Further, the accuracy of the target cell measurement performed on the basis of the generated training data depends on the purity of the measurement sample. Thus, when instrument adjustment particles, training samples, sorting samples, and the like continuously flow through one flow cell, the flow cell to be used is required to prevent a mixed flow of the plurality of samples.

Therefore, it is necessary to sufficiently clean a tube, the sample flow path, and the sample fluid supply portion before each sample is allowed to flow. The cleaning of the tube, the sample flow path, and the sample fluid supply portion is performed by the flow of a cleaning liquid. However, even when the cleaning liquid is allowed to flow for cleaning in this way, the sample may particularly remain in the tube and the sample fluid supply portion. Therefore, when a new sample is allowed to flow from the sample fluid supply portion to the sample flow path and its measurement is made, these plural sample fluids may flow in a mixed state, and accurate measurements and sorting results cannot be obtained. Thus, there is room for improvement in preventing the mixed flow of the plurality of types of samples while the plurality of sample fluids are allowed to flow through the flow cell.

An object of the present invention is to provide a flow cell of a flow cytometer capable of preventing a mixed flow of a plurality of samples when a plurality of samples are allowed to continuously flow and measured in a flow cytometer. An object of the present invention is to provide a cleaning method of a flow cell of a flow cytometer capable of preventing a plurality of samples from flowing in a mixed state.

Solution to Problem

In order to achieve the above-described object, a flow cell of a flow cytometer according to an aspect of the present invention adopts the following configuration.

[1] A flow cell of a flow cytometer according to an aspect of the present invention includes: a sample flow path through which a sample fluid containing a sample flows; and a sample fluid supply portion which communicates with an upstream end of the sample flow path in the sample fluid flow direction and configured to supply the sample fluid to the sample flow path, wherein the sample fluid supply portion includes a plurality of sample opening portions which configured to supply the sample fluid to the sample flow path, a cleaning liquid supply opening portion to which a tube is connectable and which configured to supply a cleaning liquid configured to clean the sample fluid supply portion, and a cleaning liquid discharge opening portion to which a tube is connectable and which configured to discharge the cleaning liquid from the sample fluid supply portion.

[2] In the configuration [1], the plurality of sample opening portions may be arranged in order of supplying the sample fluid.

[3] In the configuration [1] or [2], a sample opening portion which configured to supply the sample fluid last among the plurality of sample opening portions may be placed on a further downstream side of the cleaning liquid flowing from the cleaning liquid supply opening portion to the cleaning liquid discharge opening portion than the cleaning liquid supply opening portion.

[4] In the configuration [1] or [2], a sample opening portion which configured to supply the sample fluid last among the plurality of sample opening portions may also be the cleaning liquid supply opening portion.

[5] In any one of the configurations [1] to [4], a sample opening portion which configured to supply the sample fluid first among the plurality of sample opening portions may be placed on a further upstream side of the cleaning liquid flowing from the cleaning liquid supply opening portion to the cleaning liquid discharge opening portion than the cleaning liquid discharge opening portion.

[6] In any one of the configurations [1] to [4], a sample opening portion which configured to supply the sample fluid first among the plurality of sample opening portions may also be the cleaning liquid discharge opening portion.

[7] In any one of the configurations [1] to [6], a sample opening portion which configured to supply the sample fluid later among the plurality of sample opening portions may be placed on an upstream side of the cleaning liquid.

[8] In any one of the configurations [1] to [7], the sample fluid supply portion may include a cleaning liquid flow path which has the cleaning liquid supply opening portion and the cleaning liquid discharge opening portion at both ends, and the plurality of sample opening portions may be placed in the cleaning liquid flow path.

[9] In any one of the configurations [1] to [8], the sample fluid supply portion may include a communication path which configured to allow the communication of the plurality of sample opening portions with the upstream end of the sample flow path in the sample fluid flow direction, and the communication path may be thicker than the sample flow path.

In order to achieve the above-described object, a cleaning method of a flow cell of a flow cytometer according to another aspect of the present invention adopts the following configuration.

[10] A cleaning method of a flow cell of a flow cytometer according to another aspect of the present invention is a flow cell cleaning method of the flow cell of the flow cytometer according to any one of the configurations [1] to [9] including: a sample flow step of allowing the sample fluid to flow from one of the sample opening portions of the plurality of sample opening portions to the sample flow path; and a cleaning step of allowing the cleaning liquid to flow from the cleaning liquid supply opening portion to the cleaning liquid discharge opening portion.

In order to achieve the above-described object, a flow cell according to another aspect of the present invention adopts the following configuration.

[11] A flow cell of a flow cytometer according to another aspect of the present invention is a flow cell of the flow cytometer including: a sample flow path through which a sample fluid containing a sample flows; and a sample fluid supply portion which communicates with an upstream end of the sample flow path in the sample fluid flow direction and configured to supply the sample fluid to the sample flow path, wherein the sample fluid supply portion includes a plurality of opening portions, and wherein an upstream end of the sample flow path is allowed to communicate with a downstream end of the sample fluid supply portion in the sample fluid flow direction.

Advantageous Effects of Invention

According to the present invention, it is possible to provide a flow cell of a flow cytometer which makes it possible to prevent a plurality of samples from flowing in the mixed state when the plurality of samples continuously flow through the flow cytometer. According to the present invention, it is possible to provide a cleaning method of a flow cell of a flow cytometer which makes it possible to prevent a plurality of samples from flowing in the mixed state.

DESCRIPTION OF EMBODIMENTS

Hereinafter, embodiments of the present invention will be described with reference to the examples in which a flow cell of a flow cytometer according to an aspect of the present invention is applied to a cell sorter which is a flow cytometer having a function of sorting a target cell from a sample containing a plurality of types of cells.

First Embodiment (Cell Sorter)

Hereinafter, a cell sorter according to a first embodiment of the present invention will be described with reference to the drawings.

Figure 1:
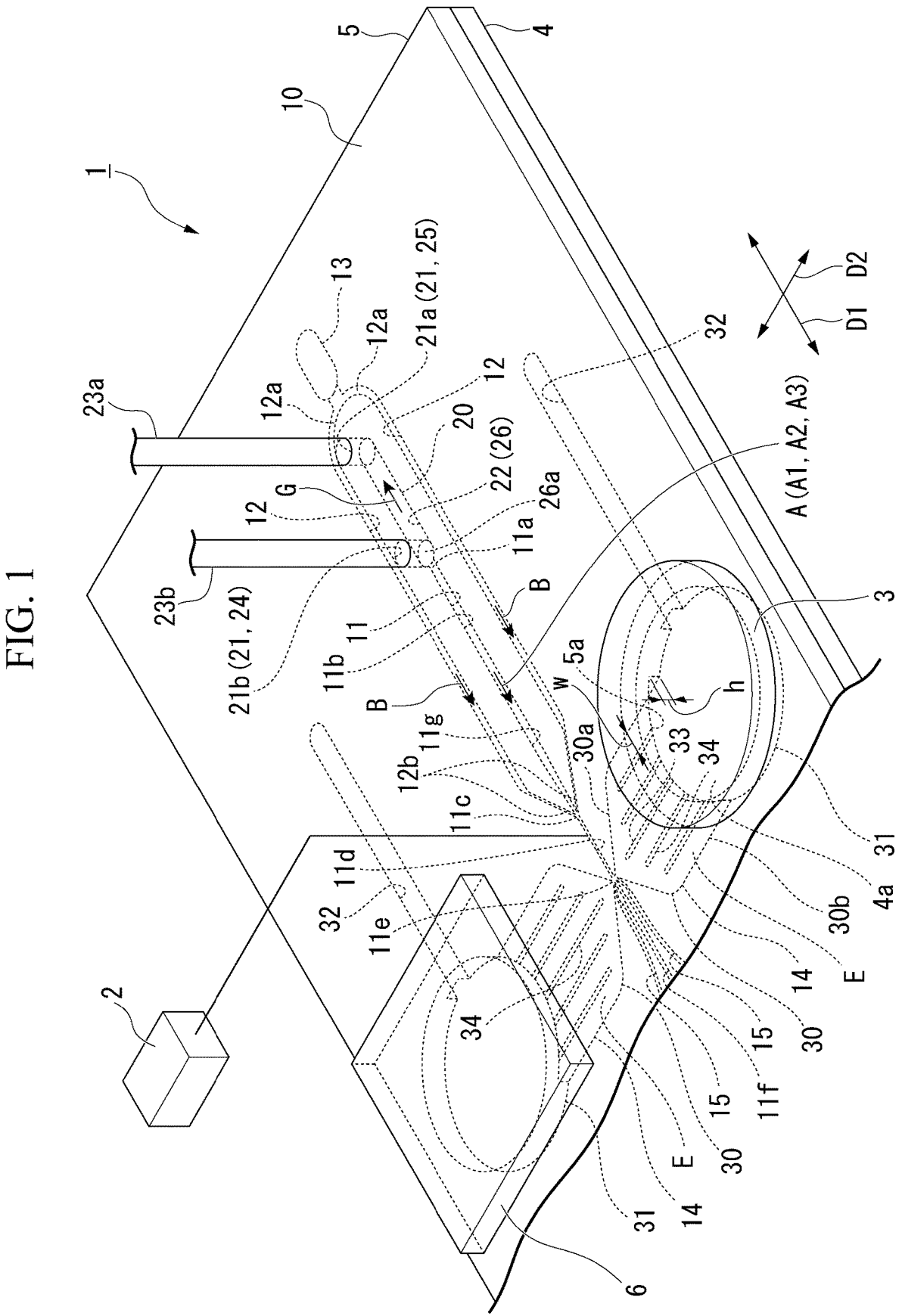
FIG. 1 is a perspective view of a cell sorter according to a first embodiment.

FIG. 1 is a perspective view of a cell sorter 1 according to the first embodiment.

Figure 2:
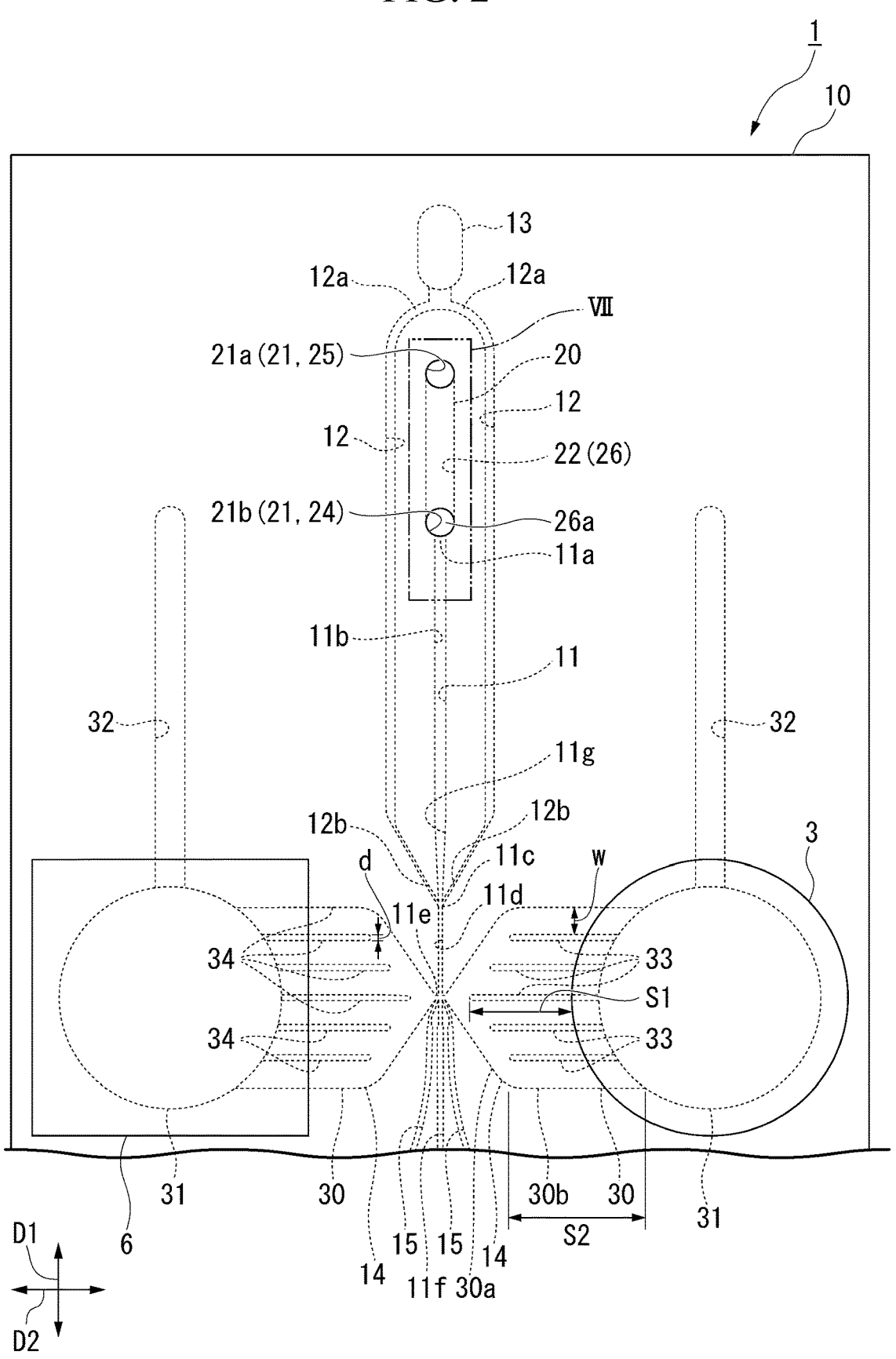
FIG. 2 is a plan view of the cell sorter according to the first embodiment.

FIG. 2 is a plan view of the cell sorter 1 according to the first embodiment.

The cell sorter 1 of this embodiment is a flow cytometer having a function of sorting a target cell from a sample fluid A containing a plurality of types of cells. The target cell is classified on the basis of, for example, scattered light or fluorescence data obtained by irradiating the cells contained in the sample fluid A with a laser beam. Machine learning can be used to classify the target cell. In that case, measurement is performed in advance using the sample fluid A containing the cells for training, a classification model is created from the obtained training data, and the target cell is classified on the basis of the classification model.

As shown in FIGS. 1 and 2, the cell sorter 1 includes a flow cell 10 (corresponding to the flow cell of the flow cytometer of the claims), a cell information acquisition device 2, and a piezoelectric element 3.

(Flow Cell)

The flow cell 10 is a rectangular plate-shaped member that extends in one direction. The flow cell 10 can be formed of a transparent hard material such as glass or quartz. As a material for forming the flow cell 10, a flexible polymer material such as polydimethylsiloxane (PDMS) can be used. Further, in the flow cell 10, as other materials, "polymers" such as thermosetting plastics, polycarbonates, polytetrafluoroethylene, and thermoplastics such as acrylic resins typified by polymethyl methacrylate (PMMA) can also be used. An appropriate combination of the materials can be used for the flow cell 10.

The flow cell 10 is formed by, for example, laminating a rectangular plate-shaped first member 4 and a rectangular plate-shaped second member 5.

The first member 4 is formed by, for example, a transparent material such as glass.

The second member 5 is formed of, for example, a transparent and flexible resin material such as polydimethylsiloxane (PDMS). A sample flow path 11, a sample fluid supply portion 20, a sheath flow path 12, a sheath liquid supply portion 13, a diversion fluid storage portion 14, and a sorting flow path 15 are formed on the side of the first member 4 in the second member 5. The sample flow path 11, the sample fluid supply portion 20, the sheath flow path 12, the sheath liquid supply portion 13, the diversion fluid storage portion 14, and the sorting flow path 15 are covered with the first member 4.

The sample flow path 11 extends in the longitudinal direction of the flow cell 10. The sample fluid A containing a sample flows through the sample flow path 11 along the longitudinal direction of the flow cell 10. The sample of the sample fluid A contains, for example, particles such as cells and beads. One end portion of the sample flow path 11 communicates with the sample fluid supply portion 20. The other end portion of the sample flow path 11 communicates with the sorting flow path 15. The sample fluid A is supplied from the sample fluid supply portion 20 and flows from one end portion of the sample flow path 11 toward the other end portion.

Hereinafter, the flow direction of the sample fluid A is referred to as a flow direction D1.

The sample flow path 11 includes an upstream end 11a of the flow direction D1, a tapering flow path 11b extending along the flow direction D1, a confluence portion 11c provided at the downstream end of the tapering flow path 11b, an alignment flow path 11d extending from the confluence portion 11c toward the downstream side along the flow direction D1, a cell sorting portion 11e provided at the downstream end of the alignment flow path 11d, and a discharge flow path 11f extending from the cell sorting portion 11e toward the downstream side along the flow direction D1.

The sample fluid A is supplied to the upstream end 11a.

A tapering portion 11g is provided at the downstream end portion of the tapering flow path 11b. In the tapering flow path 11b, a section from the upstream end 11a to the tapering portion 11g has the same flow path width. The flow path width of the tapering portion 11g becomes narrower toward the downstream side.

The confluence portion 11c allows the sample flow path 11 and the sheath flow path 12 to communicate with each other.

The alignment flow path 11d aligns the cells in the sample fluid A in a row along the flow direction D1.

The cell sorting portion 11e sorts the target cell which needs to be sorted among the cells aligned in a row by the alignment flow path 11d.

The sample fluid A that has passed through the cell sorting portion 11e flows through the discharge flow path 11f. The sample fluid A that has passed through the discharge flow path 11f is discharged to a sample tube (not shown) or the like placed on the downstream side with respect to the downstream end of the discharge flow path 11f.

The downstream end of the sample fluid supply portion 20 in the flow direction D1 of the sample fluid A communicates with the upstream end 11a of the sample flow path 11 in the flow direction D1 of the sample fluid A. The sample fluid supply portion 20 supplies the sample fluid A to the sample flow path 11. The sample fluid supply portion 20 includes two sample opening portions 21, a cleaning liquid supply opening portion 24, a cleaning liquid discharge opening portion 25, a communication path 22 which communicates two sample opening portions 21, and a cleaning liquid flow path 26.

The sample opening portion 21 penetrates the second member 5 in the thickness direction. The sample opening portion 21 supplies the sample fluid A to the sample flow path 11. Two sample opening portions 21 are arranged in order of supplying the sample fluid A to the flow cell 10 from the upstream side toward the downstream side in the flow direction D1. In two sample opening portions 21, one placed on the upstream side in the flow direction D1 is referred to as a first sample opening portion 21a. In two sample opening portions 21, one placed on the downstream side in the flow direction D1 is referred to as a second sample opening portion 21b. The first sample opening portion 21a and the second sample opening portion 21b communicate with each other by the communication path 22.

In FIGS. 1 and 2, the first sample opening portion 21a is provided at the upstream end portion of the communication path 22 in the flow direction D1.

In FIGS. 1 and 2, the second sample opening portion 21b is provided at the downstream end portion of the communication path 22 in the flow direction D1.

In the first sample opening portion 21a of two sample opening portions 21, the sample fluid A is supplied to the flow cell 10 before the second sample opening portion 21b. The first sample opening portion 21a is provided on the upstream side in the flow direction D1 in the communication path 22 with respect to the second sample opening portion 21b. In FIG. 1, the first sample opening portion 21a is placed at the end portion of the communication path 22 on the side opposite to the second sample opening portion 21b provided at the end portion of the communication path 22.

A first tube 23a (corresponding to a tube of claims) is connected to the first sample opening portion 21a. A second tube 23b (corresponding to a tube of claims) is connected to the second sample opening portion 21b. The sample fluid A is supplied to the sample fluid supply portion 20 through the first tube 23a or the second tube 23b.

In FIGS. 1 and 2, the first sample opening portion 21a also serves as the cleaning liquid discharge opening portion 25 which discharges the cleaning liquid G for cleaning the sample fluid supply portion 20. In FIGS. 1 and 2, the second sample opening portion 21b also serves as the cleaning liquid supply opening portion 24 which supplies the cleaning liquid G for cleaning the sample fluid supply portion 20.

The communication path 22 extends along the flow direction D1. The communication path 22 is thicker than the sample flow path 11. In FIGS. 1 and 2, the communication path 22 also serves as the cleaning liquid flow path 26 having the cleaning liquid supply opening portion 24 and the cleaning liquid discharge opening portion 25 at both ends. The cleaning liquid G flows through the cleaning liquid flow path 26 from the cleaning liquid supply opening portion 24 to the cleaning liquid discharge opening portion 25.

In FIGS. 1 and 2, an upstream end 26a of the cleaning liquid flow path 26 in the flow direction of the cleaning liquid G communicates with the upstream end 11a of the sample flow path 11.

The sheath flow path 12 is formed in parallel to the sample flow path 11. In FIGS. 1 and 2, two sheath flow paths 12 are formed. Two sheath flow paths 12 are symmetrically formed with the sample flow path 11 interposed therebetween. A sheath liquid B flows through the sheath flow path 12. The sheath liquid B aligns the cells in a row in the alignment flow path 11d and allows them to continuously flow.

The sheath liquid B flows through the sheath flow path 12 in the same direction as the sample fluid A from the upstream side toward the downstream side in the flow direction D1 of the sample fluid A.

Two sheath flow paths 12 communicate with each other at the upstream ends 12a and the downstream ends 12b in the flow direction of the sheath liquid B.

The downstream ends 12b of two sheath flow paths 12 communicate with the confluence portion 11c of the sample flow path 11.

In FIGS. 1 and 2, the sheath liquid supply portion 13 is provided at the upstream ends 12*a* of two sheath flow paths 12. The sheath liquid supply portion 13 communicates with the upstream ends 12*a* of two sheath flow paths 12. The sheath liquid supply portion 13 supplies the sheath liquid B to two sheath flow paths 12.

In FIGS. 1 and 2, a pair of the diversion fluid storage portions 14 is placed with the sample flow path 11 interposed therebetween. The diversion fluid storage portions 14 are symmetrically formed with the sample flow path 11 interposed therebetween. The diversion fluid storage portions 14 are provided between a wall portion 4*a* of a first member 4 constituting the flow cell 10 and a wall portion 5*a* of a second member 5 constituting the flow cell 10. The diversion fluid storage portion 14 communicates with the cell sorting portion 11*e* of the sample flow path 11. A diversion fluid E is stored in the diversion fluid storage portion 14.

The diversion fluid storage portion 14 includes a main body portion 30 and a support plate 33.

The main body portion 30 extends in a direction orthogonal to the flow direction D1 of the sample fluid A. The main body portion 30 communicates with the cell sorting portion 11*e* of the sample flow path 11. The main body portion 30 includes a tip portion 30*a* which communicates with the cell sorting portion 11*e* and a parallel portion 30*b* which extends from the tip portion 30*a* in a direction orthogonal to the flow direction D1.

The tip portion 30*a* is formed to have a larger width as it goes away from the cell sorting portion 11*e* in a direction orthogonal to the flow direction D1 of the sample fluid A. The parallel portion 30*b* extends in a direction orthogonal to the flow direction D1 with a constant width.

The chamber 31 is provided at a position farther from the cell sorting portion 11*e* than the main body portion 30. The chamber 31 penetrates the second member 5 in the thickness direction. The chamber 31 is formed to have a circular shape in a plan view. One chamber 31 of the pair of chambers 31 is covered with the piezoelectric element 3. The center of the piezoelectric element 3 coincides with the center of the chamber 31. The other chamber 31 of the pair of chambers 31 is covered with, for example, a transparent glass plate 6. The piezoelectric element 3 may be provided at both of the pair of chambers 31.

A diversion fluid discharge passage 32 extends from the chamber 31 toward the upstream side in the flow direction D1. The diversion fluid discharge passage 32 includes a diversion fluid discharge portion (not shown) provided at the end portion on the side opposite to the chamber 31. The diversion fluid E is discharged from the diversion fluid discharge portion when filling the diversion fluid storage portion 14 with the diversion fluid E. The diversion fluid E supplied from the alignment flow path 11*d* flows through the main body portion 30 to pass through the chamber 31 and the excessive diversion fluid E is discharged from the diversion fluid discharge passage 32. The diversion fluid E flows to be orthogonal to the flow direction D1 of the sample fluid A from the piezoelectric element 3 toward the sample flow path 11 in the main body portion 30.

Hereinafter, the flow direction of the diversion fluid E in the main body portion 30 is referred to as a flow direction D2.

A plurality of the support plates 33 are provided inside the main body portion 30. The support plate 33 extends in the flow direction D2 of the diversion fluid E. The support plate 33 connects the wall portion 4*a* of the first member 4 to the wall portion 5*a* of the second member 5 (see FIG. 1). A plurality of the diversion flow paths 34 through which the diversion fluid E flows are formed along the support plates 33.

The diversion flow path 34 extends in the flow direction D2 of the diversion fluid E.

The sorting flow path 15 is placed on the downstream side of the diversion fluid storage portion 14 in the flow direction D1 of the sample fluid A. The sorting flow path 15 communicates with the cell sorting portion 11*e* of the sample flow path 11. The sorting flow path 15 is provided with the sample flow path 11 interposed therebetween. The sorting flow path 15 extends in the flow direction D1 along the discharge flow path 11*f* of the sample flow path 11. A test tube (not shown) for collecting the sorted target cell is placed on the downstream side of the downstream end of the sorting flow path 15.

(Cell Information Acquisition Device)

The cell information acquisition device 2 is connected to the alignment flow path 11*d* of the sample flow path 11. The cell information acquisition device 2 includes, for example, a laser beam source (not shown), a detector (not shown), a control unit (not shown), and the like. The cell information acquisition device 2 irradiates the cells contained in the sample fluid A with a laser beam. The cell information acquisition device 2 detects scattered light and fluorescence generated from the cells by the irradiation of the laser beam by a detector and acquires, for example, information on cell internal structures such as cell morphology, nuclei, and granules. The cell information acquisition device 2 classifies the target cell to be sorted from the plurality of cells contained in the sample fluid A by the control unit on the basis of the acquired information. Additionally, it is more desirable that the cell information acquisition device 2 according to this embodiment has a function of learning the characteristics of the target cells by machine learning, but the present invention is not limited thereto. The cell information acquisition device 2 may be configured to acquire, for example, individual information of the cells flowing through the alignment flow path 11*d*. As such a cell information acquisition device 2, a JSAN cell sorter (manufactured by Bay Bioscience Co., Ltd.) or the like can be used.

(Piezoelectric Element)

The piezoelectric element 3 is formed in a columnar shape. The piezoelectric element 3 covers the through-hole of the chamber 31. In a plan view, the centers of the piezoelectric element 3 and the chamber 31 are placed to coincide with each other. The end portion of the support plate 33 is provided along the outer shape of the chamber 31 in a plan view.

The piezoelectric element 3 changes the hydraulic pressure inside the diversion fluid storage portion 14 and allows the diversion fluid E to flow in a direction (flow direction D2) intersecting the flow direction D1 of the sample fluid A. The piezoelectric element 3 is electrically connected to the cell information acquisition device 2. For example, a pulsed voltage is applied from the cell information acquisition device 2 to the piezoelectric element 3. The piezoelectric element 3 is deformed in response to the applied voltage. The hydraulic pressure in the diversion fluid storage portion 14 and the chamber 31 changes due to the deformation of the piezoelectric element 3. The diversion fluid E flows in the flow direction D2 in accordance with a change in the hydraulic pressure in the diversion fluid storage portion 14 and the chamber 31 caused by the piezoelectric element 3.

(Cell Sorter Using Method and Flow Cell Cleaning Method)

Hereinafter, a method of using the cell sorter 1 and a method of cleaning the flow cell 10 will be described as an example with reference to FIG. 1.

A method of using the cell sorter 1 and a method of cleaning the flow cell 10 include an instrument adjustment step (corresponding to a sample flow step of claims), a cleaning step after the instrument adjustment step, a training step (corresponding to the sample flow step of claims), a cleaning step after the training step, and a sorting step (corresponding to the sample flow step of claims). In the use of the cell sorter 1, the sample fluid A containing a plurality of measurement samples flows through the flow cell 10. In the method of using the cell sorter 1 below, an example will be described in which the cleaning steps are provided between the respective steps when different measurement samples are flowed, but the present invention is not limited thereto. Depending on the number of samples contained in the sample fluid A flowing through the flow cell 10 and the properties of the samples, the subsequent cleaning step can be omitted.

Further, in the following description, an example will be described in which the sample fluid A contains an instrument adjustment sample fluid A1 containing particles such as standard beads flowing in the instrument adjustment step, a training sample fluid A2 containing a training sample flowing in the training step, and a sorting sample fluid A3 containing a sorting sample flowing in the sorting step, but the present invention is not limited thereto. The sample fluid A may further contain a sample for adjusting the sorting step or the like if necessary.

(Instrument Adjustment Step)

In the instrument adjustment step, the instrument adjustment sample fluid A1 containing the instrument adjustment sample is supplied from the first sample opening portion 21*a* of the sample fluid supply portion 20. The instrument adjustment step is a step of checking whether or not the cell sorter 1 to be used is in a suitable measurement state and adjusting the cell sorter in advance if necessary. The instrument adjustment sample fluid A1 contains, for example, standard beads whose particle characteristics are known in advance (for example, fluorescently labeled beads (fluorescent beads) used in the examples described later). The instrument adjustment sample fluid A1 flows through the sample fluid supply portion 20 and the sample flow path 11, for example, at a flow rate from 10 μL/min to 30 μL/min. Particles contained in the instrument adjustment sample fluid A1 flow while being aligned in a row through the alignment flow path 11*d* of the sample flow path 11. Next, information on individual particles flowing through the alignment flow path 11*d* is acquired by the cell information acquisition device 2 and hence the operational state of the cell sorter 1 can be checked.

When the instrument adjustment sample fluid A1 flows, the second sample opening portion 21*b* to which the instrument adjustment sample fluid A1 is not supplied is closed.

(Cleaning Step after the Instrument Adjustment Step)

In the use of the cell sorter 1, the flow cell 10 needs to be washed when shifting from the instrument adjustment step to the training step. Particularly, it is necessary to clean the sample fluid supply portion 20 in which the sample used for instrument adjustment tends to remain.

In the cleaning step after the instrument adjustment step, the cleaning liquid G is supplied from the second sample opening portion 21*b* (cleaning liquid supply opening portion 24) to the sample fluid supply portion 20 through the second tube 23*b*. The cleaning liquid G is pressurized in the second tube 23*b* toward the sample fluid supply portion 20. The cleaning liquid G supplied to the sample fluid supply portion 20 is sucked from the first sample opening portion 21*a* (cleaning liquid discharge opening portion 25). Accordingly, the cleaning liquid G flows from the cleaning liquid supply opening portion 24 to the cleaning liquid discharge opening portion 25 through the cleaning liquid flow path 26 (that is, the sample fluid supply portion 20 is cleaned in a direction opposite to the direction in which the instrument adjustment sample fluid A1 flows through the sample fluid supply portion 20). The cleaning liquid G flows through, for example, the sample fluid supply portion 20 at a flow rate from 0.1 mL/min to 10 mL/min. Accordingly, the sample fluid supply portion 20, the first tube 23*a*, and the second tube 23*b* are reliably cleaned. The instrument adjustment sample fluid A1 remaining in the sample fluid supply portion 20 and the first tube 23*a* is removed.

(Training Step)

In the training step, first, the training sample fluid A2 containing the training sample is supplied from the first sample opening portion 21*a* of the sample fluid supply portion 20. The training sample fluid A2 is allowed to flow from the first sample opening portion 21*a* to the sample flow path 11. The training sample fluid A2 contains, for example, cells used for training. The training sample fluid A2 flows through the sample fluid supply portion 20 and the sample flow path 11, for example, at a flow rate from 10 μL/min to 30 μL/min. The cells contained in the training sample fluid A2 flow while being aligned in a row in the alignment flow path 11*d* of the sample flow path 11.

Next, the cell information acquisition device 2 reads information from individual cells flowing through the alignment flow path 11*d* and learns a criterion for classifying the target cell. In the cell sorter 1 of this embodiment, training data for machine learning can be obtained by allowing a training cell sample having a correct label to flow in this training step. It is desirable that the cell information acquisition device 2 according to this embodiment has a function of learning the characteristics of the target cell by machine learning. In that case, a model (criteria) for classifying the target cell using the acquired training data is created by machine learning.

When the training sample fluid A2 flows, the second sample opening portion 21*b* to which the training sample fluid A2 is not supplied is closed.

(Cleaning Step after the Training Step)

In the use of the cell sorter 1, the flow cell 10 needs to be washed when shifting from the training step to the sorting step. Particularly, it is necessary to clean the sample fluid supply portion 20 in which the sample used for training tends to remain.

In the cleaning step after the training step, the cleaning liquid G is supplied from the second sample opening portion 21*b* (cleaning liquid supply opening portion 24) to the sample fluid supply portion 20 through the second tube 23*b*. The cleaning liquid G is pressurized in the second tube 23*b* toward the sample fluid supply portion 20. The cleaning liquid G supplied to the sample fluid supply portion 20 is sucked from the first sample opening portion 21*a* (cleaning liquid discharge opening portion 25). Accordingly, the cleaning liquid G flows from the cleaning liquid supply opening portion 24 to the cleaning liquid discharge opening portion 25 through the cleaning liquid flow path 26 (that is, the sample fluid supply portion 20 is cleaned in a direction opposite to the direction in which the training sample fluid A2 flows through the sample fluid supply portion 20). The cleaning liquid G flows through, for example, the sample fluid supply portion 20 at a flow rate from 0.1 mL/min to 10 mL/min. Accordingly, the sample fluid supply portion 20, the first tube 23*a*, and the second tube 23*b* are reliably cleaned by a required amount of solution. The flow rate of the cleaning liquid G can be appropriately selected to a high speed from 5 mL/min to 10 mL/min or a low speed of about 0.1 mL/min. The training sample fluid A2 remaining in the sample fluid supply portion 20 and the first tube 23*a* is removed.

(Sorting Step)

In the sorting step, first, the sorting sample fluid A3 containing the sample to be sorted is supplied from the second sample opening portion 21*b* of the sample fluid supply portion 20. The sorting sample fluid A3 is allowed to flow from the second sample opening portion 21*b* to the sample flow path 11. The sorting sample fluid A3 contains a plurality of types of cells including the target cells to be sorted. The sorting sample fluid A3 flows through the sample fluid supply portion 20 and the sample flow path 11, for example, at a flow rate from 10 μL/min to 30 μL/min. The plurality of cells contained in the sorting sample fluid A3 flow while being aligned in a row in the alignment flow path 11*d* of the sample flow path 11.

When the sorting sample fluid A3 flows, the first sample opening portion 21*a* to which the sorting sample fluid A3 is not supplied is closed.

A plurality of cells pass through the detectable region of the cell information acquisition device 2 one by one at a constant velocity. Therefore, the cell information acquisition device 2 can detect each of the plurality of cells.

Next, the cell information acquisition device 2 classifies the target cell from various cells flowing in the alignment flow path 11*d* based on the target cell classification criterion learned in the training step. The cell information acquisition device 2 applies, for example, a pulsed voltage to the piezoelectric element 3 when the target cell is identified.

The piezoelectric element 3 is deformed when a pulsed voltage is applied from the cell information acquisition device 2. One diversion fluid storage portion 14 provided with the piezoelectric element 3 is depressurized by the deformation of the piezoelectric element 3. The diversion fluid E flows along the flow direction D2 orthogonal to the flow direction D1 when the diversion fluid storage portion 14 is depressurized.

The diversion fluid E flows from the cell sorting portion 11*e* toward the chamber 31 and passes through the diversion flow path 34. The target cell arriving at the cell sorting portion 11*e* is drawn toward the side of the diversion fluid storage portion 14 which is placed on the piezoelectric element 3 side with the sample flow path 11 interposed therebetween. The target cell is drawn by the fluid pressure and its moving direction changes from the flow direction D1 to a direction along the sorting flow path 15. The target cell moves toward the sorting flow path 15 which is placed on the piezoelectric element 3 side with the sample flow path 11 interposed therebetween in the pair of sorting flow paths 15.

The target cells having moved toward the sorting flow path 15 are collected at the downstream end of the sorting flow path 15 and moves into, for example, a test tube installed downstream.

By the above-described steps, the target cells are sorted.

The diversion fluid storage portion 14 is depressurized by the piezoelectric element 3 in this embodiment, but it may be pressurized. In this case, the diversion fluid E flows in a direction opposite to that of the case of depressurization by the piezoelectric element 3 and the target cells move to the sorting flow path 15 on the side opposite to the piezoelectric element 3 with the sample flow path 11 interposed therebetween.

Although it is not described in the above description, a sample for preparing an instrument may be allowed to flow in order to adjust the sorting step when shifting to the sorting step in the use of the cell sorter 1. In that case, the sample fluid A containing a sorting step adjustment sample (hereinafter, also referred to as a delay adjustment sample) may be allowed to flow in advance in order to adjust a cell sorting timing. Then, the cleaning step may be appropriately performed and the sorting step may be performed.

(Operation and Effect)

According to the first embodiment, it is possible to obtain the operation and effect below.

The sample fluid supply portion 20 includes the first sample opening portion 21*a* and the second sample opening portion 21*b*. Accordingly, the instrument adjustment sample fluid A1 and the training sample fluid A2 can be supplied from the first sample opening portion 21*a* and the sorting sample fluid A3 can be supplied from the second sample opening portion 21*b*, respectively. Thus, the flow cell 10 may allow the instrument adjustment sample fluid A1, the training sample fluid A2, and the sorting sample fluid A3 to flow through the flow cell 10 while preventing mixing in the sample fluid supply portion 20.

The sample fluid supply portion 20 includes a cleaning liquid supply opening portion 24 which supplies the cleaning liquid G and a cleaning liquid discharge opening portion 25 which discharges the cleaning liquid G from the sample fluid supply portion 20. Accordingly, in the sample fluid supply portion 20, the cleaning liquid G can be allowed to flow from the cleaning liquid supply opening portion 24 to the cleaning liquid discharge opening portion 25 in the direction opposite to the direction in which the instrument adjustment sample fluid A1 (and the training sample fluid A2) flows through the sample fluid supply portion 20. Thus, since the sample fluid supply portion 20 can be cleaned, the flow cell 10 can prevent a mixed flow of the sample fluids A (that is, the instrument adjustment sample fluid A1, the training sample fluid A2, and the sorting sample fluid A3). The mixed flow of the sample fluids A herein includes one which is caused by the contamination of the sample fluid A with the sample contained in the sample fluid A previously circulated. For example, the mixed flow of the sorting sample fluid A3 includes the one which is caused by the contamination of the sorting sample fluid A3 with the residual instrument adjustment sample or training sample. In this case, the plurality of samples flow in a mixed state.

Thus, the flow cell 10 can prevent a mixed flow of the plurality of samples when the plurality of samples (that is, the instrument adjustment sample, the training sample, and the sorting sample) contained in the plurality of sample fluids A (that is, the instrument adjustment sample fluid A1, the training sample fluid A2, and the sorting sample fluid A3) continuously flow through the cell sorter 1.

The first sample opening portion 21*a* and the second sample opening portion 21*b* are arranged in order of supplying the training sample fluid A2 and the sorting sample fluid A3. Accordingly, it is possible to easily distinguish the first sample opening portion 21*a* to which the training sample fluid A2 is supplied and the second sample opening portion 21*b* to which the training sample fluid A2 is not supplied. Therefore, the sorting sample fluid A3 can be reliably supplied to the sample fluid supply portion 20 from the second sample opening portion 21*b* different from the first sample opening portion 21*a*. Thus, it is possible to prevent the sorting sample fluid A3 from flowing in a mixed state with the training sample fluid A2. Thus, the flow cell 10 can prevent a mixed flow of the training sample and the sorting sample when the training sample and the sorting sample continuously flow through the cell sorter 1.

In FIG. 1, the first sample opening portion 21a is placed on the side opposite to the upstream end 11a of the sample flow path 11 with respect to the second sample opening portion 21b. That is, the second sample opening portion 21b is placed on the upstream side of the cleaning liquid G with respect to the first sample opening portion 21a. Accordingly, the first sample opening portion 21a to which the sorting sample fluid A3 is not supplied can be easily distinguished from the second sample opening portion 21b to which the sorting sample fluid A3 is supplied. Therefore, it is possible to reliably clean the first sample opening portion 21a to which the training sample fluid A2 or the like is supplied. Thus, it is possible to prevent the sorting sample fluid A3 from flowing in a mixed state with other instrument adjustment sample fluid A1 or training sample fluid A2. Thus, the flow cell 10 can prevent a mixed flow of the sorting sample with other instrument adjustment sample or training sample when the plurality of samples continuously flow through the cell sorter 1.

The first sample opening portion 21a and the second sample opening portion 21b are provided in the cleaning liquid flow path 26. Accordingly, since the cleaning liquid G passes through the first sample opening portion 21a and the second sample opening portion 21b when the cleaning liquid G is allowed to flow through the cleaning liquid flow path 26, it is possible to clean the first sample opening portion 21a and the second sample opening portion 21b together. Thus, since the sample fluid supply portion 20 can be efficiently cleaned, the flow cell 10 can efficiently prevent the sorting sample fluid A3 from flowing in a mixed state with the instrument adjustment sample fluid A1 or the training sample fluid A2. Thus, the flow cell 10 can prevent a mixed flow of the plurality of samples when the plurality of samples continuously flow through the cell sorter 1.

The first sample opening portion 21a to which the sample fluid A (that is, the instrument adjustment sample fluid A1 and the training sample fluid A2) is supplied earlier than the second sample opening portion 21b is the cleaning liquid discharge opening portion 25. Accordingly, since the flow cell 10 can circulate the cleaning liquid G inside the first tube 23a connected to the first sample opening portion 21a, it is possible to remove the instrument adjustment sample fluid A1 and the training sample fluid A2 remaining in the first tube 23a. In addition, the removed sample fluid A (that is, the instrument adjustment sample fluid A1 and the training sample fluid A2) is discharged to the outside of the sample fluid supply portion 20 through the first tube 23a. When discharged from the first sample opening portion 21a (that is, the cleaning liquid discharge opening portion 25) to the outside of the sample fluid supply portion 20, the removed sample fluid A does not pass through the sample fluid supply portion 20 and its downstream flow path of the flow cell 10. Thus, since the sample fluid supply portion 20 can be reliably cleaned, it is possible to prevent the sorting sample fluid A3 from flowing in a mixed state with other instrument adjustment sample fluid A1 and training sample fluid A2. Thus, the flow cell 10 can prevent a mixed flow of the sorting sample with other instrument adjustment sample or training sample when the plurality of samples continuously flow through the cell sorter 1.

According to this configuration, it is possible to reliably clean the first sample opening portion 21a. Thus, it is possible to prevent the sorting sample fluid A3 from being mixed with the instrument adjustment sample fluid A1 and the training sample fluid A2 at the first sample opening portion 21a. Thus, the flow cell 10 can prevent the sorting sample from flowing in a mixed state with other instrument adjustment sample or training sample when the plurality of samples continuously flow through the cell sorter 1.

According to this configuration, it is not necessary to separately provide the cleaning liquid discharge opening portion 25 other than the first sample opening portion 21a. Therefore, it is possible to decrease the size of the sample fluid supply portion 20. Thus, it is possible to decrease the size of the flow cell 10.

The second sample opening portion 21b to which the sample fluid A is supplied after the first sample opening portion 21a is the cleaning liquid supply opening portion 24. Accordingly, since the cleaning liquid G can be supplied from the second sample opening portion 21b, the cleaning liquid G which is not contaminated by the instrument adjustment sample fluid A1 or the training sample fluid A2 can be allowed to flow to the sample fluid supply portion 20. Thus, since it is possible to clean the sample fluid supply portion 20 including the second sample opening portion 21b by the cleaning liquid G which is not contaminated, it is possible to prevent mixing the sorting sample fluid A3 with other instrument adjustment sample fluid A1 or training sample fluid A2. Thus, the flow cell 10 can prevent a mixed flow of the sorting sample with other instrument adjustment sample or training sample when the plurality of samples continuously flow through the cell sorter 1.

According to this configuration, it is possible to reliably clean the second sample opening portion 21b. Thus, it is possible to prevent the sorting sample fluid A3 from being mixed with the instrument adjustment sample fluid A1 or the training sample fluid A2 at the second sample opening portion 21b. Thus, the flow cell 10 can prevent the sorting sample from flowing in a mixed state with other instrument adjustment sample or training sample when the plurality of samples continuously flow through the cell sorter 1.

According to this configuration, it is not necessary to separately provide the cleaning liquid supply opening portion 24 other than the second sample opening portion 21b. Therefore, it is possible to decrease the size of the sample fluid supply portion 20. Thus, it is possible to decrease the size of the flow cell 10.

The communication path 22 is thicker than the sample flow path 11. Accordingly, the flow path resistance of the communication path 22 against the fluid can be reduced, and it is possible to rapidly clean the communication path 22 with a large amount of a liquid. Thus, since it is possible to reliably clean the sample fluid supply portion 20, it is possible to prevent a mixed flow between the training sample fluid A2 and the sorting sample fluid A3. Thus, the flow cell 10 can prevent a mixed flow of the training sample with the sorting sample when the training sample and the sorting sample continuously flow through the cell sorter 1.

The method of cleaning the flow cell 10 includes a cleaning step of allowing the cleaning liquid G to flow from the cleaning liquid supply opening portion 24 to the cleaning liquid discharge opening portion 25. Accordingly, it is possible to clean the sample fluid supply portion 20. Thus, it is possible to prevent the sorting sample fluid A3 from flowing in a mixed state with the instrument adjustment sample fluid A1 or the training sample fluid A2. That is, the flow cell 10 can prevent a mixed flow of the sorting sample with the instrument adjustment sample or the training sample even when the instrument adjustment sample and the training sample are allowed to flow through the cell sorter 1 before the sorting sample is allowed to flow.

Second Embodiment

Hereinafter, a second embodiment of the present invention will be described with reference to the drawings.

Figure 3:
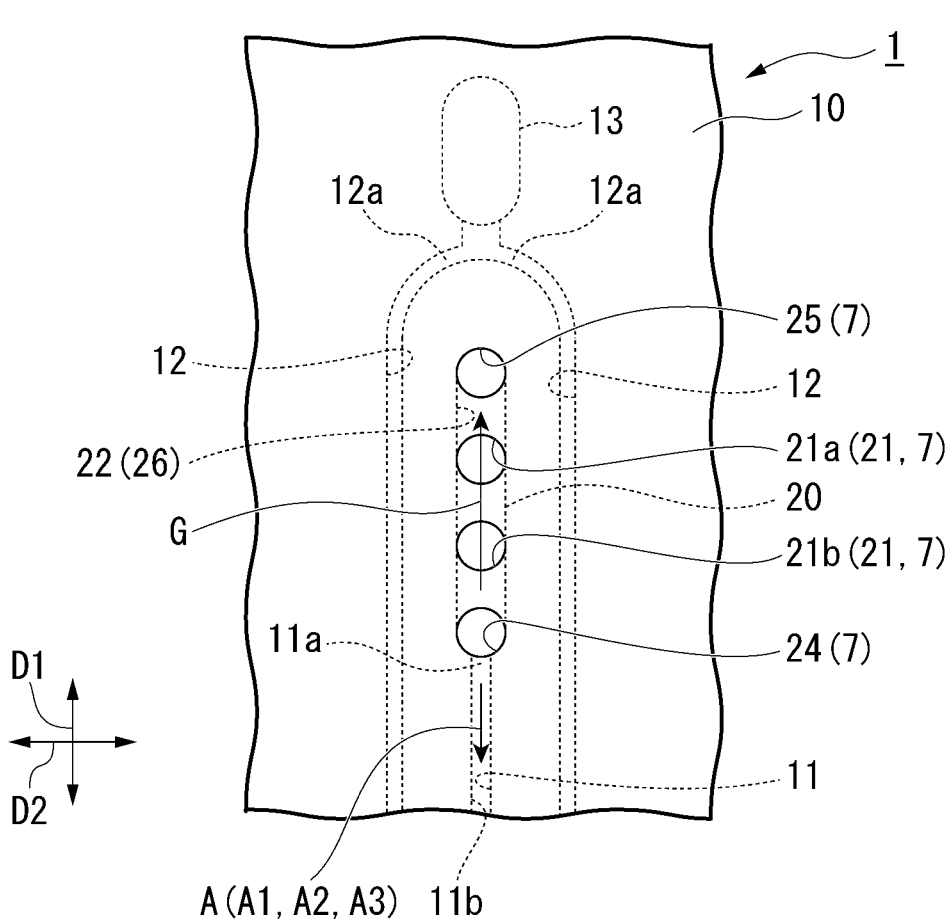
FIG. 3 is an enlarged plan view of a sample fluid supply portion according to a second embodiment.

FIG. 3 is an enlarged plan view of the sample fluid supply portion 20 according to the second embodiment.

In the first embodiment, the sample fluid supply portion 20 includes two opening portions (sample opening portions) 21 of a first sample opening portion 21a and a second sample opening portion 21b. In contrast, the second embodiment is different from the first embodiment in that the sample fluid supply portion 20 includes four opening portions 7. In the second embodiment, the same reference numerals are given to the same configurations as those of the first embodiment described above and the description thereof will be omitted or simplified.

As shown in FIG. 3, the sample fluid supply portion 20 includes four opening portions 7. One opening portion 7 of four opening portions 7 is the first sample opening portion 21a. One opening portion 7 of four opening portions 7 is the second sample opening portion 21b. One opening portion 7 of four opening portions 7 is the cleaning liquid supply opening portion 24. One opening portion 7 of four opening portions 7 is the cleaning liquid discharge opening portion 25.

Four opening portions 7 are arranged in order of the cleaning liquid supply opening portion 24, the second sample opening portion 21b, the first sample opening portion 21a, and the cleaning liquid discharge opening portion 25 from the side closer to the upstream end 11a of the sample flow path 11. As shown in FIG. 3, the first sample opening portion 21a to which the sample fluid A is supplied earlier than the second sample opening portion 21b is placed on the upstream side of the flow of the cleaning liquid G flowing from the cleaning liquid supply opening portion 24 to the cleaning liquid discharge opening portion 25 with respect to the cleaning liquid discharge opening portion 25. The second sample opening portion 21b is placed on the downstream side of the flow of the cleaning liquid G flowing from the cleaning liquid supply opening portion 24 to the cleaning liquid discharge opening portion 25 with respect to the cleaning liquid supply opening portion 24.

(Cell Sorter Using Method and Flow Cell Cleaning Method)

Hereinafter, among the method of using the cell sorter 1 and the method of cleaning the flow cell 10 according to this embodiment, the cleaning step will be described.

(Cleaning Step)

After the instrument adjustment step or the training step ends, the cleaning liquid G is supplied from the cleaning liquid supply opening portion 24 to the sample fluid supply portion 20. The cleaning liquid G is pressurized toward the sample fluid supply portion 20. The cleaning liquid G supplied to the sample fluid supply portion 20 is sucked from the cleaning liquid discharge opening portion 25. Accordingly, the cleaning liquid G flows from the cleaning liquid supply opening portion 24 to the cleaning liquid discharge opening portion 25. The cleaning liquid G flows through, for example, the sample fluid supply portion 20 at a flow rate from 0.1 mL/min to 10 mL/min. Accordingly, the sample fluid supply portion 20 is reliably cleaned by a required amount of solution.

(Operation and Effect)

According to the second embodiment, it is possible to obtain the operation and effect below.

The second sample opening portion 21b to which the sample fluid A is supplied after the first sample opening portion 21a is placed on the downstream side of the cleaning liquid supply opening portion 24 in the flow of the cleaning liquid G flowing from the cleaning liquid supply opening portion 24 to the cleaning liquid discharge opening portion 25. Accordingly, since the cleaning liquid G passes through the second sample opening portion 21b, it is possible to reliably clean the second sample opening portion 21b by the cleaning liquid G. Thus, it is possible to prevent the sorting sample fluid A3 from being mixed with the instrument adjustment sample fluid A1 or the training sample fluid A2 remaining in the second sample opening portion 21b. Thus, it is possible to prevent a mixed flow of the sorting sample with other instrument adjustment sample or training sample when the plurality of samples continuously flow through the cell sorter 1.

Further, the first sample opening portion 21a to which the sample fluid A is supplied earlier than the second sample opening portion 21b is placed on the upstream side of the cleaning liquid discharge opening portion 25 in the flow of the cleaning liquid G flowing from the cleaning liquid supply opening portion 24 to the cleaning liquid discharge opening portion 25. Accordingly, since the cleaning liquid G passes through the first sample opening portion 21a, it is possible to reliably clean the first sample opening portion 21a by the cleaning liquid G. The second sample opening portion 21b is placed on the upstream side of the first sample opening portion 21a in the flow of the cleaning liquid G flowing from the cleaning liquid supply opening portion 24 to the cleaning liquid discharge opening portion 25. Accordingly, the cleaning liquid G cleaning the first sample opening portion 21a is discharged from the cleaning liquid discharge opening portion 25 without passing through the second sample opening portion 21b. Thus, it is possible to prevent the sorting sample fluid A3 from being mixed with the instrument adjustment sample fluid A1 or the training sample fluid A2 remaining in the first sample opening portion 21a. Thus, it is possible to prevent the sorting sample from flowing in a mixed state with the other instrument adjustment sample or training sample when the plurality of samples continuously flow through the cell sorter 1.

(Modified Example of Cell Sorter Using Method and Flow Cell Cleaning Method)

Hereinafter, a modified example of the method of using the cell sorter 1 and the method of cleaning the flow cell 10 of the second embodiment will be described.

Figure 4:
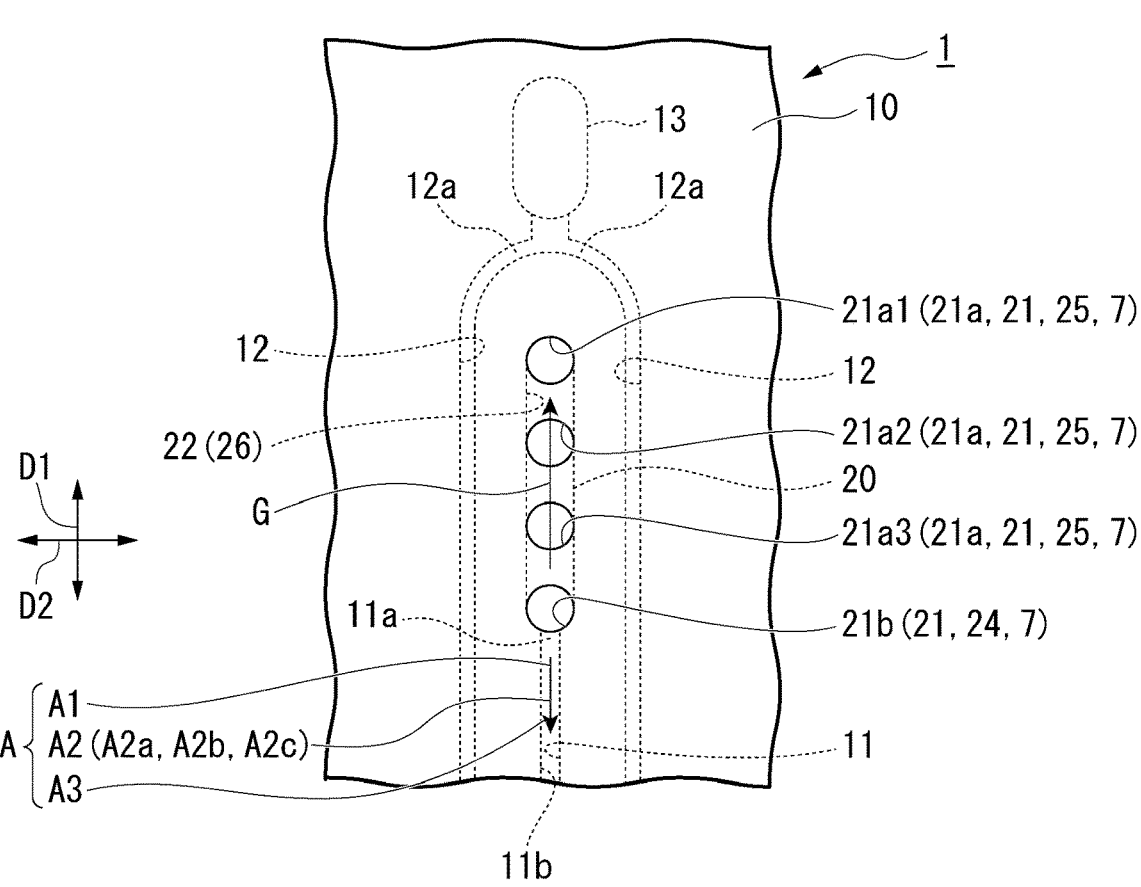
FIG. 4 is an enlarged plan view of a sample fluid supply portion according to a modified example of the second embodiment.

FIG. 4 is an enlarged plan view of the sample fluid supply portion 20 according to the modified example of the second embodiment.

In the second embodiment, the sample fluid supply portion 20 separately includes the cleaning liquid supply opening portion 24 and the cleaning liquid discharge opening portion 25 other than the first sample opening portion 21a and the second sample opening portion 21b. In contrast, as shown in FIG. 4, all four opening portions 7 may be used as the sample opening portions 21. In the modified example of the second embodiment, the same reference numerals are given to the same configurations as those of the first embodiment or the second embodiment and the description thereof will be omitted or simplified.

The four sample opening portions 21 are numbered first, second, third, and fourth in order of the distance from the upstream end 11a of the sample flow path 11. The sample opening portion 21 at the first location is the furthest away from the upstream end 11*a*. The sample opening portion 21 at the fourth location is closest to the upstream end 11*a*. The sample opening portions 21 at the first to third locations are different first sample opening portions 21*a* (21*a*1, 21*a*2, and 21*a*3, respectively) to which different training sample fluids A2 (a first training sample fluid A2*a*, a second training sample fluid A2*b*, and a third training sample fluid A2*c*, respectively) are supplied. Specifically, the first training sample fluid A2*a* of the training sample fluid A2 is supplied to the first sample opening portion 21*a* (21*a*1) at the first location. The second training sample fluid A2*b* of the training sample fluid A2 is supplied to the first sample opening portion 21*a* (21*a*2) at the second location. The third training sample fluid A2*c* of the training sample fluid A2 is supplied to the first sample opening portion 21*a* (21*a*3) at the third location. The sample opening portion 21 at the fourth location is the second sample opening portion 21*b* to which the sorting sample fluid A3 is supplied. The sample opening portions 21 (first sample opening portions 21*a*1, 21*a*2, and 21*a*3) at the first to third locations are the cleaning liquid discharge opening portions 25. The sample opening portion 21 (second sample opening portion 21*b*) at the fourth location is the cleaning liquid supply opening portion 24.

The method of using the cell sorter 1 and the method of cleaning the flow cell 10 include an instrument adjustment step, a first cleaning step (corresponding to a cleaning step of claims), a first training step, a second cleaning step (corresponding to a cleaning step of claims), a second training step, a third cleaning step (corresponding to a cleaning step of claims), a third training step, a fourth cleaning step (corresponding to a cleaning step of claims), and a sorting step.

(Instrument Adjustment Step)

In the instrument adjustment step, the instrument adjustment sample fluid A1 is supplied from the sample opening portion 21 at the first location (first sample opening portion 21*a*1) to flow. When the instrument adjustment sample fluid A1 flows, other first sample opening portions 21*a* to which the instrument adjustment sample fluid A1 are not supplied are closed. The second sample opening portion 21*b* is closed. The instrument adjustment sample fluid A1 contains the sample for equipment adjustment. Particles contained in the instrument adjustment sample fluid A1 flow while being aligned in a row in the alignment flow path 11*d* of the sample flow path 11. Next, information on individual particle flowing through the alignment flow path 11*d* is acquired by the cell information acquisition device 2 and the operation state of the cell sorter 1 can be checked.

When the instrument adjustment sample fluid A1 flows, the other first sample opening portions 21*a* to which the instrument adjustment sample fluid A1 are not supplied are closed. The second sample opening portion 21*b* is closed.

(First Cleaning Step)

In the first cleaning step, the cleaning liquid G is allowed to flow by using the sample opening portion 21 at the first location (first sample opening portion 21*a*1) to which the instrument adjustment sample fluid A1 was supplied as the cleaning liquid discharge opening portion 25. When the flow of the cleaning liquid G flows, other first sample opening portions 21*a* which are not the cleaning liquid discharge opening portion 25 are closed.

(First Training Step)

In the first training step, the first training sample fluid At*a* is supplied from the sample opening portion 21 at the first location (first sample opening portion 21*a*1) to flow. When the training sample fluid A2*a* flows, other first sample opening portions 21*a* to which the training sample fluid A2*a* are not supplied are closed. The second sample opening portion 21*b* is closed. The training sample fluid A2*a* contains the first training cells. The cell information acquisition device 2 measures the first training cells and learns information.

(Second Cleaning Step)

In the second cleaning step, the cleaning liquid G is allowed to flow by using the first sample opening portion 21*a*1 to which the training sample fluid A2*a* containing the first training cells was supplied as the cleaning liquid discharge opening portion 25. When the cleaning liquid G flows, other first sample opening portions 21*a* which are not the cleaning liquid discharge opening portion 25 are closed.

(Second Training Step)

In the second training step, the second training sample fluid A2*b* is supplied from the sample opening portion 21 at the second location (first sample opening portion 21*a*2) to flow. When the training sample fluid A2*b* flows, other first sample opening portions 21*a* to which the training sample fluid A2*b* are not supplied are closed. The second sample opening portion 21*b* is closed. The training sample fluid A2*b* contains the cells for the second training. The cell information acquisition device 2 measures the second training cells and learns information.

(Third Cleaning Step)

In the third cleaning step, the cleaning liquid G is allowed to flow by using the sample opening portion 21 at the second location (first sample opening portion 21*a*2) to which the training sample fluid A2*b* containing the second training cells was supplied as the cleaning liquid discharge opening portion 25. When the cleaning liquid G flows, the other first sample opening portion 21*a* which is not the cleaning liquid discharge opening portion 25 is closed.

(Third Training Step)

In the third training step, the third training sample fluid A2*c* is supplied from the sample opening portion 21 at the third location (first sample opening portion 21*a*3) to flow. When the training sample fluid A2*c* flows, other first sample opening portions 21*a* to which the training sample fluid A2*c* are not supplied are closed. The second sample opening portion 21*b* is closed. The training sample fluid A2*c* contains the cells for the third training. The cell information acquisition device 2 measures the third training cells and learns information.

(Fourth Cleaning Step)

In the fourth cleaning step, the cleaning liquid G is allowed to flow by using the sample opening portion 21 at the third location (first sample opening portion 21*a*3) to which the training sample fluid A2*c* containing the third training cells was supplied as the cleaning liquid discharge opening portion 25. When the cleaning liquid G flows, other first sample opening portions 21*a* which are not the cleaning liquid discharge opening portion 25 are closed.

(Sorting Step)

In the sorting step, the sorting sample fluid A3 is supplied from the sample opening portion 21 at the fourth location (second sample opening portion 21*b*) to flow. The sorting sample fluid A3 contains the first training cells, the second training cells, and the third training cells. When the sorting sample fluid A3 flows, three first sample opening portions 21*a* are closed.

The cell information acquisition device 2 classifies whether the cell having passed through the alignment flow path 11*d* of the sample flow path 11 is a first training cell, a second training cell, or a third training cell on the basis of a prediction model created by the training in the first training step, the second training step, and the third training step.

For example, if the first training cells are the target cells, when the cell information acquisition device 2 classifies the cell as a first training cell, a voltage is applied to the piezoelectric element 3. The piezoelectric element 3 pressurizes the diversion fluid storage portion 14. Accordingly, the cell moves to the sorting flow path 15 on the side opposite to the piezoelectric element 3 with the sample flow path 11 interposed therebetween.

For example, if the second training cells are not the target cells, when the cell information acquisition device 2 classifies the cell as a second training cell, no voltage is applied to the piezoelectric element 3. Therefore, since the flow direction of the cell does not change, the cell flows through the discharge flow path 11*f*.

For example, if the third training cells are another target cells, when the cell information acquisition device 2 classifies the cell as a third training cell, a voltage is applied to the piezoelectric element 3. The piezoelectric element 3 depressurizes the diversion fluid storage portion 14. Accordingly, the cell moves to the sorting flow path 15 on the side of the piezoelectric element 3 with the sample flow path 11 interposed therebetween.

By the above steps, the first training cells, the second training cells, and the third training cells are classified and the target cells are sorted.

(Operation and Effect)

According to the modified example of the method of using the cell sorter 1 and the method of cleaning the flow cell 10, it is possible to obtain the operation and effect below.

Three opening portions 7 of four opening portions 7 are the first sample opening portions 21*a*. Accordingly, it is possible to supply different training sample fluids A2 from the three first sample opening portions 21*a*, which allows the flowing of the plurality of training sample fluids A2.

The method of using the cell sorter 1 and the method of cleaning the flow cell 10 include an instrument adjustment step, a first cleaning step, a first training step, a second cleaning step, a second training step, a third cleaning step, a third training step, a fourth cleaning step, and a sorting step. Accordingly, the sample fluid supply portion 20 can be cleaned between the instrument adjustment step and the first training step, between the first training step and the second training step, between the second training step and the third training step, and between the third training step and the sorting step. Therefore, it is possible to prevent both a mixed flow among the plurality of training sample fluids A2 and a mixed flow among the instrument adjustment sample fluid A1, the plurality of training sample fluids A2, and the sorting sample fluid A3.

Thus, according to this modified example, along with being able to flow the plurality of training sample fluids A2, a mixed flow among the plurality of training sample fluids A2 as well as a mixed flow among the instrument adjustment sample fluid A1, the plurality of training sample fluids A2, and the sorting sample fluid A3 can be prevented. Thus, according to the flow cell 10 of this modified example, not only a mixed flow among the plurality of training samples but also a mixed flow among the instrument adjustment sample, the plurality of training samples, and the sorting sample can be prevented when the instrument adjustment sample, the plurality of training samples, and the sorting sample continuously flow through the cell sorter 1.

In the second embodiment, the sample fluid supply portion 20 includes four opening portions 7, but the number of the opening portions 7 can be appropriately selected.

Third Embodiment

Hereinafter, a third embodiment of the present invention will be described with reference to the drawings.

Figure 5:
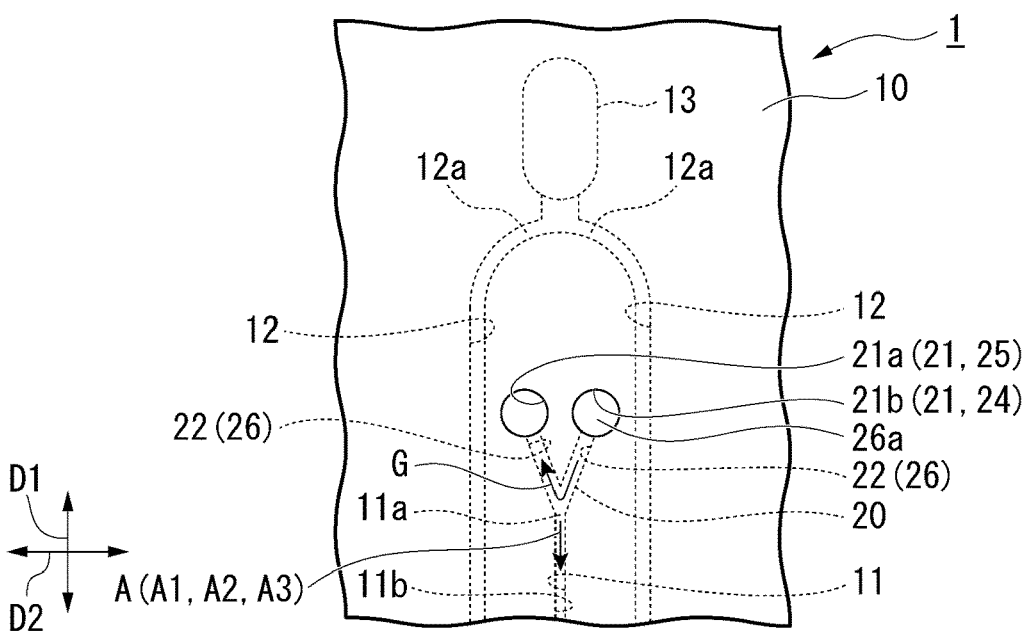
FIG. 5 is an enlarged plan view of a sample fluid supply portion according to a third embodiment.

FIG. 5 is an enlarged plan view of the sample fluid supply portion 20 according to the third embodiment.

In the first embodiment and the second embodiment, the cleaning liquid flow path 26 communicates with the sample flow path 11 at one end. For example, in the first embodiment described in FIG. 1 or 2, the cleaning liquid flow path 26 communicates with the upstream end 11*a* of the sample flow path 11 at the upstream end 26*a* in the flow direction of the cleaning liquid G. However, the example of FIG. 5 is different from the example of the first embodiment in that the cleaning liquid flow path 26 communicates with the upstream end 11*a* of the sample flow path 11 at the intermediate portion in the flow direction of the cleaning liquid G. In the description of the third embodiment, the same reference numerals are given to the same configurations as those of the first embodiment and the description thereof will be omitted or simplified.

As shown in FIG. 5, in the cleaning liquid flow path 26, the cleaning liquid supply opening portion 24 is placed at the position of the upstream end 26*a* in the flow direction of the cleaning liquid G and the cleaning liquid discharge opening portion 25 is placed at the opposite end. The cleaning liquid flow path 26 serves as the sample fluid supply portion 20. In the cleaning liquid flow path 26, the second sample opening portion 21*b* is placed at the position of the upstream end 26*a* in the flow direction of the cleaning liquid G and the first sample opening portion 21*a* is placed at the opposite end. Further, the sample fluid supply portion 20 communicates with the upstream end 11*a* of the sample flow path 11 at the intermediate portion of the communication path 22. In FIG. 5, the second sample opening portion 21*b* is placed on the right side of the drawing and the first sample opening portion 21*a* is placed on the left side of the drawing. However, the positions of the first sample opening portion 21*a* (serving as the cleaning liquid discharge opening portion 25) and the second sample opening portion 21*b* (serving as the cleaning liquid supply opening portion 24) may be reversed.

(Modified Example of Third Embodiment)

Hereinafter, a modified example of the third embodiment will be described with reference to the drawings.

Figure 6:
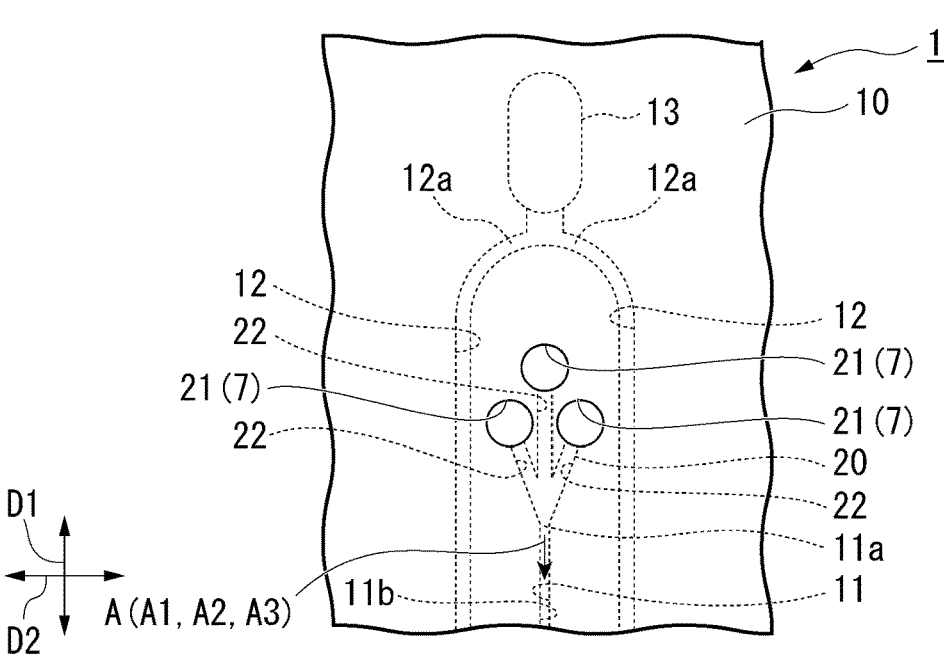
FIG. 6 is an enlarged plan view of a sample fluid supply portion according to a modified example of the third embodiment.

FIG. 6 is an enlarged plan view of the sample fluid supply portion 20 according to the modified example of the third embodiment.

In the third embodiment, the sample fluid supply portion 20 includes two sample opening portions 21 of the first sample opening portion 21*a* and the second sample opening portion 21*b*. In contrast, in the modified example of the third embodiment shown in FIG. 6, an example is described in which the sample fluid supply portion 20 includes three opening portions 7 which are all sample opening portions 21. In the description of the modified example below, the same reference numerals are given to the same configurations as those of the third embodiment and the description thereof will be omitted or simplified.

As shown in FIG. 6, the sample fluid supply portion 20 includes three opening portions 7. Three communication paths 22 extend from the upstream end 11*a* of the sample flow path 11 toward the upstream side in the flow direction D1. Three communication paths 22 communicate with three corresponding opening portions 7.

(Cell Sorter Using Method and Flow Cell Cleaning Method)

As described above, in the description of FIG. 6, an example is described in which all three opening portions 7 are used as the sample opening portions 21.

In this case, first, the order in which the sample fluid A is supplied is arbitrarily determined for the three sample opening portions 21. Among the three sample opening portions 21, the sample opening portion 21 to which the sample fluid A is supplied thirdly is used as the cleaning liquid supply opening portion 24.

Next, the sample fluid A is supplied from the sample opening portion 21 to which the sample fluid A is supplied firstly among three sample opening portions 21.

Next, the cleaning liquid G is allowed to flow by using the sample opening portion 21 to which the sample fluid A was supplied firstly as the cleaning liquid discharge opening portion 25. Accordingly, a portion which is contaminated by the sample fluid A in the sample fluid supply portion 20 is cleaned.

The sample fluid A is supplied in the same procedure to the sample opening portions 21 to which the sample fluids A are supplied secondly and thirdly among three sample opening portions 21 so that the cleaning liquid G flows for the cleaning purpose.

In this modified example, it is assumed that the sample fluid supply portion 20 includes three opening portions 7 as an example. However, the number of the opening portions 7 provided in the sample fluid supply portion 20 can be appropriately selected.

Although the preferred embodiments of the present invention have been described above, the present invention is not limited to these embodiments. It is possible to add, omit, replace, and modify the configuration without departing from the contents of the present invention. The present invention is not limited by the above description, but only by the appended claims.

In addition, it is possible to replace the components in the above-described embodiments with well-known components as appropriate and to combine the modified examples as appropriate without departing from the contents of the present invention.

EXAMPLES

Hereinafter, examples to which the present invention was applied will be described with reference to the drawings.

Figure 7:
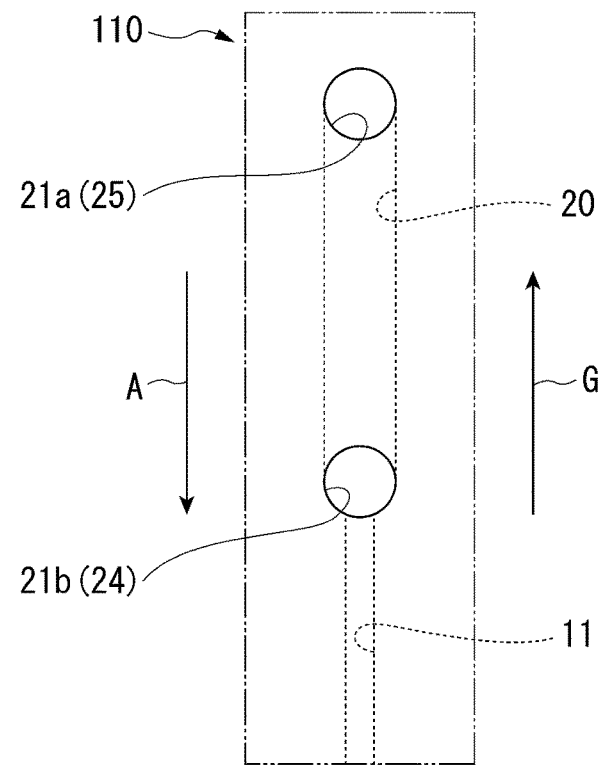
FIG. 7 is an enlarged schematic view of a sample fluid supply portion in an example of a flow cell used in the cleaning test of examples.
Figure 8:
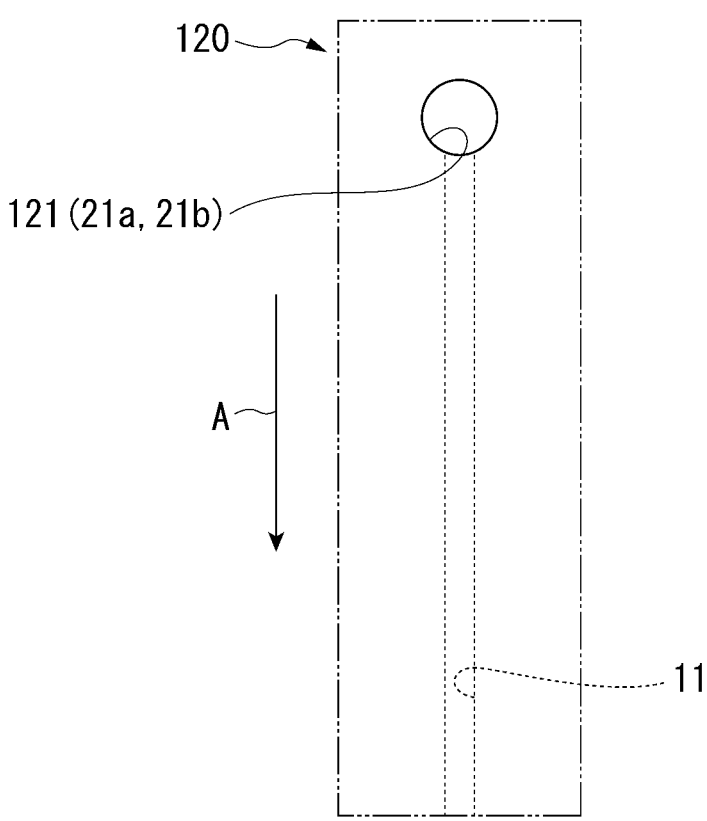
FIG. 8 is an enlarged schematic view of a sample fluid supply portion of another example of the flow cell used in the cleaning test of the examples.

FIG. 7 is an enlarged schematic view of the sample fluid supply portion 20 (the first sample opening portion 21*a* and the second sample opening portion 21*b*) of a flow cell 110 to be described later. FIG. 7 shows a portion surrounded by VII in FIG. 2. FIG. 8 is an enlarged schematic view of an opening portion 121 of a flow cell 120 to be described later. The flow cell 120 shown in FIG. 8 is a flow cell in which a portion surrounded by VII shown in FIG. 2 is changed. Since its configuration is the same as that of the flow cell 10 (cell sorter 1) shown in FIG. 2 except for the portion shown in FIGS. 7 and 8, the description thereof is omitted.

A cleaning test was performed in order to evaluate the flow cell to which the present invention was applied.

In Example 1, the flow cell 110 having a cleaning mechanism provided with the cleaning liquid supply opening portion 24 and the cleaning liquid discharge opening portion 25 was used. As shown in FIG. 7, the flow cell 110 had a configuration in which the cleaning liquid supply opening portion 24 was placed on the further downstream side of the flow of the sample fluid A than the cleaning liquid discharge opening portion 25. The cleaning liquid supply opening portion 24 and the cleaning liquid discharge opening portion 25 communicated with each other by the sample fluid supply portion 20. Further, as shown in FIG. 7, in the flow cell 110, one end portion of the sample flow path 11 communicated with the sample fluid supply portion 20.

Similar to the example of the flow cell 10 described in FIGS. 1 and 2, the second sample opening portion 21*b* into which the sample was poured also served as the cleaning liquid supply opening portion 24 in the flow cell 110. The second sample opening portion 21*b* (cleaning liquid supply opening portion 24) behaved as a test port. The test port was a port for feeding the sorting sample. However, in this cleaning test, the sheath liquid not containing cells was poured from the test port and the cleaning effect of the flow cell of the present invention was evaluated.

Further, in the flow cell 110, the first sample opening portion 21*a* into which fluorescent beads for calibration and cells (a delay adjustment sample and a training sample) were poured also served as the cleaning liquid discharge opening portion 25. The first sample opening portion 21*a* (cleaning liquid discharge opening portion 25) functioned as the calibration port. The calibration port is a port for feeding a delay adjustment sample and a training sample.

In Comparative Example 1, the flow cell 120 not including the cleaning mechanism was used. In the flow cell 120, the opening portion 121 served not only as the calibration port (first sample opening portion 21*a*) but also as the test port (second sample opening portion 21*b*). Therefore, in FIG. 8, the first sample opening portion 21*a* and the second sample opening portion 21*b* are shown as the same opening portion 121.

Example 1

The following sample flow step S11 and the cleaning step S12 were performed on the flow cell 110 to obtain Example 1.

(Sample Flow Step (Instrument Adjustment Step): S11)

As the sample fluid to flow through the flow cell 110, fluorescent beads (SPHERO FP-10052-2 Fluorescent Yellow Particles, 10.0-14.0 μm, manufactured by Bay Bioscience) and RH30 cells (Human Rhabdomyosarcoma cell line) were used.

Specifically, about 200,000 fluorescent beads for calibration were allowed to flow from the cleaning liquid discharge opening portion 25 into the flow cell 110 in the direction of arrow A in FIG. 7. Subsequently, about 500,000 RH30 cells were allowed to flow into the flow cell 110 from the cleaning liquid discharge opening portion 25 in the direction of arrow A in FIG. 7 as the delay adjustment sample and the training sample.

(Cleaning Step: S12)

After the sample flow step described above, 20 mL of sheath liquid for cleaning (cleaning liquid G) was allowed to flow from the cleaning liquid supply opening portion 24 to the cleaning liquid discharge opening portion 25 (in the direction of arrow G in FIG. 7) and the sample fluid supply portion 20 was cleaned.

<Comparative 1>

The following sample flow step S21 was performed on the flow cell 120 to obtain Comparative Example 1.

(Sample Flow Step (Instrument Adjustment Step): S21)

In the sample flow step S21, the same sample fluid as the sample fluid used in the flow cell 110 was used for the flow cell 120.

Specifically, about 200,000 fluorescent beads for calibration were allowed to flow from the opening portion 121 into the flow cell 120 in the direction of arrow A in FIG. 8. Subsequently, a total of about 500,000 RH30 cells were allowed to flow from the opening portion 121 into the sample flow path 11 of the flow cell 120 in the direction of arrow A in FIG. 8 as the delay adjustment sample and the training sample.

<Evaluation of Cleaning Test>

In this cleaning test, the flow cell 110 and the flow cell 120 were incorporated into a JSAN cell sorter (manufactured by Bay Bioscience Co., Ltd.) and the total number of residual beads and residual cells was detected.

More specifically, in the flow cell 110, 1 mL of the sheath liquid not containing cells is allowed to flow from the cleaning liquid supply opening portion 24 into the sample flow path 11 after the cleaning step S12, and the total number of residual beads and residual cells flowing into the alignment flow path 11*d* in FIG. 1 was detected by the JSAN cell sorter. Accordingly, the cleaning test in the flow cell 110 was evaluated.

In the flow cell 120, 1 mL of the sheath liquid not containing cells is allowed to flow from the second sample opening portion 21*b* into the sample flow path 11 after the sample flow step S21, and the total number of residual beads and residual cells flowing into the alignment flow path 11*d* in FIG. 1 was detected by the JSAN cell sorter. Accordingly, the cleaning test in the flow cell 120 was evaluated.

As a result, the total number of residual beads and residual cells detected from Example 1 was 0.

On the other hand, the total number of residual beads and residual cells detected from Comparative Example 1 was 29493.

As described above, according to the flow cell 110 of the present invention and the method of cleaning the flow cell 110, the sample fluid (residual beads and residual cells) remaining in the sample fluid supply portion 20 was not detected and it became clear that the plurality of samples could be prevented from flowing in a mixed state.

INDUSTRIAL APPLICABILITY

According to the present invention, it is possible to provide a flow cell of the flow cytometer capable of preventing a plurality of samples from flowing in a mixed state when the plurality of samples continuously flow through the flow cytometer. According to the present invention, it is possible to provide a cleaning method of the flow cell of the flow cytometer capable of preventing a plurality of samples from flowing in a mixed state.

REFERENCE SIGNS LIST

10 Flow cell (flow cell of the flow cytometer)
11 Sample flow path
11*a* Upstream end
20 Sample fluid supply portion
21 Sample opening portion
22 Communication path
23*a* First tube (tube)
23*b* Second tube (tube)
24 Cleaning liquid supply opening portion
25 Cleaning liquid discharge opening portion
26 Cleaning flow path
A Sample fluid
E Diversion fluid
G Cleaning liquid

What is claimed is:

1. A flow cell of a flow cytometer comprising:
a sample flow path through which a sample fluid containing a sample flows; and
a sample fluid supply portion which communicates with an upstream end of the sample flow path in a sample fluid flow direction and is configured to supply the sample fluid to the sample flow path,
wherein the sample fluid supply portion includes a plurality of sample opening portions which are configured to supply the sample fluid to the sample flow path, a cleaning liquid supply opening portion to which a tube is connectable and which is configured to supply a cleaning liquid configured to clean the sample fluid supply portion, and a cleaning liquid discharge opening portion to which a tube is connectable and which is configured to discharge the cleaning liquid from the sample fluid supply portion, and
wherein the cleaning liquid supply opening portion and the cleaning liquid discharge opening portion are placed in the sample fluid supply portion so that the cleaning liquid flows in the sample fluid supply portion in a direction opposite to the sample fluid flow direction when the cleaning liquid flows in the sample fluid supply portion from the cleaning liquid supply opening portion to the cleaning liquid discharge opening portion.

2. The flow cell of the flow cytometer according to claim 1,
wherein the plurality of sample opening portions are arranged in order of supplying the sample fluid.

3. The flow cell of the flow cytometer according to claim 1,
wherein a sample opening portion which is configured to supply the sample fluid last among the plurality of sample opening portions is placed on a further downstream side of the cleaning liquid flowing from the cleaning liquid supply opening portion to the cleaning liquid discharge opening portion than the cleaning liquid supply opening portion.

4. The flow cell of the flow cytometer according to claim 1,
wherein a sample opening portion which is configured to supply the sample fluid last among the plurality of sample opening portions is also the cleaning liquid supply opening portion.

5. The flow cell of the flow cytometer according to claim 1,
wherein a sample opening portion which is configured to supply the sample fluid first among the plurality of sample opening portions is placed on a further upstream side of the cleaning liquid flowing from the cleaning liquid supply opening portion to the cleaning liquid discharge opening portion than the cleaning liquid discharge opening portion.

6. The flow cell of the flow cytometer according to claim 1,
wherein a sample opening portion which is configured to supply the sample fluid first among the plurality of sample opening portions is also the cleaning liquid discharge opening portion.

7. The flow cell of the flow cytometer according to claim 1,
wherein a sample opening portion which is configured to supply the sample fluid later among the plurality of sample opening portions is placed on an upstream side of the cleaning liquid.

8. The flow cell of the flow cytometer according to claim 1, wherein the sample fluid supply portion includes a cleaning liquid flow path which has the cleaning liquid supply opening portion and the cleaning liquid discharge opening portion at both ends, and wherein the plurality of sample opening portions are placed in the cleaning liquid flow path.

9. The flow cell of the flow cytometer according to claim 1, wherein the sample fluid supply portion includes a communication path which is configured to allow the communication of the plurality of sample opening portions with the upstream end of the sample flow path in the sample fluid flow direction, and wherein the communication path is thicker than the sample flow path.

10. The flow cell of the flow cytometer according to claim 2, wherein a sample opening portion which is configured to supply the sample fluid last among the plurality of sample opening portions is placed on a further downstream side of the cleaning liquid flowing from the cleaning liquid supply opening portion to the cleaning liquid discharge opening portion than the cleaning liquid supply opening portion.

11. The flow cell of the flow cytometer according to claim 2, wherein a sample opening portion which is configured to supply the sample fluid last among the plurality of sample opening portions is also the cleaning liquid supply opening portion.

12. The flow cell of the flow cytometer according to claim 2, wherein a sample opening portion which is configured to supply the sample fluid first among the plurality of sample opening portions is placed on a further upstream side of the cleaning liquid flowing from the cleaning liquid supply opening portion to the cleaning liquid discharge opening portion than the cleaning liquid discharge opening portion.

13. The flow cell of the flow cytometer according to claim 3, wherein the sample opening portion which is configured to supply the sample fluid first among the plurality of sample opening portions is placed on a further upstream side of the cleaning liquid flowing from the cleaning liquid supply opening portion to the cleaning liquid discharge opening portion than the cleaning liquid discharge opening portion.

14. The flow cell of the flow cytometer according to claim 4, wherein the sample opening portion which is configured to supply the sample fluid first among the plurality of sample opening portions is placed on a further upstream side of the cleaning liquid flowing from the cleaning liquid supply opening portion to the cleaning liquid discharge opening portion than the cleaning liquid discharge opening portion.

15. The flow cell of the flow cytometer according to claim 2, wherein a sample opening portion which is configured to supply the sample fluid first among the plurality of sample opening portions is also the cleaning liquid discharge opening portion.

16. The flow cell of the flow cytometer according to claim 3, wherein the sample opening portion which is configured to supply the sample fluid first among the plurality of sample opening portions is also the cleaning liquid discharge opening portion.

17. The flow cell of the flow cytometer according to claim 4, wherein the sample opening portion which is configured to supply the sample fluid first among the plurality of sample opening portions is also the cleaning liquid discharge opening portion.

18. The flow cell of the flow cytometer according to claim 2, wherein a sample opening portion which is configured to supply the sample fluid later among the plurality of sample opening portions is placed on an upstream side of the cleaning liquid.

19. A cleaning method of a flow cell of a flow cytometer according to claim 1 comprising:

a sample flow step of allowing the sample fluid to flow from one of the plurality of sample opening portions to the sample flow path; and a cleaning step of allowing the cleaning liquid to flow from the cleaning liquid supply opening portion to the cleaning liquid discharge opening portion.

20. A flow cell of a flow cytometer comprising:

a sample flow path through which a sample fluid containing a sample flows;

a sample fluid supply portion which communicates with an upstream end of the sample flow path in a sample fluid flow direction and is configured to supply the sample fluid to the sample flow path; and a sheath flow path through which a sheath liquid flows, wherein the sample flow path has an upstream end communicating with the sample fluid supply portion, and a confluence portion which is provided downstream of the upstream end along the sample fluid flow direction and communicates with a downstream end of the sheath flow path, wherein the sample fluid supply portion includes a plurality of sample opening portions arranged in the sample fluid flow direction within the sample fluid supply portion; and a communication path which communicates the plurality of sample opening portions in the sample fluid flow direction within the sample fluid supply portion and is configured to allow communication of the plurality of sample opening portions with the upstream end of the sample flow path in the sample fluid flow direction, wherein the plurality of sample opening portions are arranged in the sample fluid supply portion so that the sample fluid is supplied to the sample flow path from at least one of the plurality of sample opening portions, and wherein the communication path is thicker than the confluence portion of the sample flow path.

* * * * *